United States Patent [19]

Nerone

[11] Patent Number: 5,717,295

[45] Date of Patent: *Feb. 10, 1998

[54] LAMP POWER SUPPLY CIRCUIT WITH FEEDBACK CIRCUIT FOR DYNAMICALLY ADJUSTING LAMP CURRENT

[75] Inventor: Louis R. Nerone, Brecksville, Ohio

[73] Assignee: General Electric Company, Schenectady, N.Y.

[*] Notice: The term of this patent shall not extend beyond the expiration date of Pat. No. 5,703,439.

[21] Appl. No.: 644,318

[22] Filed: May 10, 1996

[51] Int. Cl.$^6$ ............................................ G05F 1/00
[52] U.S. Cl. .................... 315/307; 315/209 R; 315/224; 315/291; 315/DIG. 7
[58] Field of Search ........................... 315/307, 219, 315/209 R, 208, 224, 244, 291, DIG. 5, DIG. 7

[56] References Cited

U.S. PATENT DOCUMENTS

| | | | |
|---|---|---|---|
| 4,251,752 | 2/1981 | Stolz | 315/206 |
| 4,383,203 | 5/1983 | Stanley | 315/248 |
| 4,523,131 | 6/1985 | Zansky | 315/307 |
| 4,988,920 | 1/1991 | Hoeksma | 315/101 |
| 5,075,599 | 12/1991 | Overgoor et al. | 315/224 |
| 5,341,068 | 8/1994 | Nerone | 315/219 |
| 5,363,020 | 11/1994 | Chen et al. | 315/209 R |
| 5,414,325 | 5/1995 | Allison | 315/158 |
| 5,550,436 | 8/1996 | Houk | 315/209 R |

Primary Examiner—Robert Pascal
Assistant Examiner—Haissa Philogene
Attorney, Agent, or Firm—George E. Hawranko

[57] ABSTRACT

A ballast circuit for a gas discharge lamp comprises a resonant load circuit incorporating a gas discharge lamp and including first and second resonant impedances whose values determine the operating frequency of the resonant load circuit. A d.c.-to-a.c. converter circuit is coupled to the resonant load circuit to induce an a.c. current in the resonant load circuit. It comprises first and second switches serially connected between a bus conductor at a d.c. voltage and ground, with a common node through which the bidirectional load current flows. An arrangement allows a user to select a setpoint signal during lamp operation that determines the amount of light output by the lamp. A feedback arrangement regeneratively controls the first and second switches; it includes a circuit for sensing a.c. current in the resonant load circuit and producing an a.c. feedback signal in proportion to the a.c. current; a circuit for producing a d.c. feedback signal representing an average value of a lamp output parameter; a circuit for generating an error signal between the setpoint signal and the d.c. feedback signal; a comparator circuit for comparing the a.c. feedback signal with a periodic reference signal, and for producing a comparator output signal that changes state when a one of the compared signals becomes greater than the other of the compared signals, and vice-versa; and a circuit for generating the periodic reference signal in response to both the comparator output signal and the error signal. A conditioning circuit receptive of the comparator output signal controls the first and second switches.

10 Claims, 3 Drawing Sheets

LAMP POWER SUPPLY CIRCUIT WITH FEEDBACK CIRCUIT FOR DYNAMICALLY ADJUSTING LAMP CURRENT

CROSS-REFERENCE TO RELATED APPLICATION

This application is related to commonly assigned application Ser. No. 08/644,466, entitled "Lamp Power Supply Circuit with Electronic Feedback Circuit for Switch Control," by Louis R. Nerone, the present inventor. The foregoing application was concurrently filed with, and is co-pending with, the instant application.

FIELD OF THE INVENTION

The present invention relates to a power supply, or ballast circuit for a gas discharge lamp. More particularly, it relates to a power supply circuit with plural power switches controlled by a feedback circuit in such manner as to allow a user to dynamically adjust the level of light output by the lamp.

BACKGROUND OF THE INVENTION

A gas discharge lamp, such as a fluorescent lamp, typically utilizes a power supply, or ballast circuit to convert an d.c. line voltage to a high frequency d.c. voltage which is impressed across a resonant load circuit containing the gas discharge lamp. The resonant load circuit includes a resonant inductor and a resonant capacitor for determining the frequency of resonance of current in the resonant load circuit. The power supply circuit includes a series half-bridge d.c.-to-d.c. converter having a pair of power switches that alternately connect one end of the resonant load circuit to a d.c. bus voltage and then to a ground, thereby impressing the mentioned d.c. voltage across the resonant load circuit.

A prior ballast circuit of the foregoing type is disclosed in co-pending U.S. Pat. No. 5,341,068, issued Aug. 23, 1994, entitled "Electronic Ballast Arrangement for a Compact Fluorescent Lamp," by Louis R. Nerone, the present inventor, and assigned to the present assignee. The disclosed ballast circuit utilizes a feedback circuit for controlling the mentioned pair of power switches of the d.c.-to-a.c. converter. The feedback circuit operates in response to a feedback signal representing an a.c. current in the resonant load circuit. The use of the foregoing circuit for controlling the power switches beneficially results in regenerative, or so-called self-resonant, control of the power switches. Accordingly, the ballast circuit of the foregoing patent application avoids the expense and bulk of extra circuitry for switch control.

The feedback circuit of the foregoing patent application, however, utilizes a magnetic-core transformer with multiple windings. The inclusion of such transformer adds considerable bulk to ballast size, which is an especially acute issue with so-called compact fluorescent lamps having a standard screw-type base for insertion into a conventional incandescent lamp socket. A feedback circuit avoiding the use of a magnetic transformer is disclosed in the above cross-referenced application Ser. No. 08/644,466. The feedback circuit is of the self-resonant type, and is comprised of components which can be implemented in solid-state form, and the majority of which can be incorporated into an integrated circuit.

Different levels of lamp current can be accommodated by the circuitry disclosed in the foregoing application Ser. No. 08/644,466. However, this typically requires the selection of values for the components (e.g. resistors) of the feedback circuit which, for size considerations, are preferably discrete components rather than adjustable. For applications where control of lamp current is required while the lamp is operating, such as for dimmable lamps, it would be desirable to provide, in a lamp ballast, a feedback circuit for facilitating simple control of lamp current during lamp operation. It would also be desirable to enable more accurate operation of a lamp at a user-selected setpoint.

OBJECTS AND SUMMARY OF THE INVENTION

It is, therefore, an object of the present invention to provide a ballast circuit for a gas discharge lamp that includes, for controlling a pair of power switches, a self-resonant feedback circuit which allows a user to adjust the output of the lamp during lamp operation.

A further object of the invention is to provide, for a ballast circuit of the foregoing type, a user-selectable setpoint of an output parameter of the lamp at which the lamp will more accurately operate.

Another object of the invention is to provide, for a ballast circuit of the foregoing type, a self-resonant feedback comprised of components which can be implemented in solid-state form, and the majority of which can be incorporated into an integrated circuit.

In accordance with one form of the invention, there is provided a ballast circuit for a gas discharge lamp, comprising a resonant load circuit incorporating a gas discharge lamp and including first and second resonant impedances whose values determine the operating frequency of the resonant load circuit. A d.c.-to-a.c. converter circuit is coupled to the resonant load circuit to induce an a.c. current in the resonant load circuit. It comprises first and second switches serially connected between a bus conductor at a d.c. voltage and ground, with a common node through which the bidirectional load current flows. An arrangement allows a user to select a setpoint signal during lamp operation that determines the amount of light output by the lamp. A feedback arrangement regeneratively controls the first and second switches; it includes a circuit for sensing a.c. current in the resonant load circuit and producing an a.c. feedback signal in proportion to the a.c..current; a circuit for producing a d.c. feedback signal representing an average value of a lamp output parameter; a circuit for generating an error signal between the setpoint signal and the d.c. feedback signal; a comparator circuit for comparing the a.c. feedback signal with a periodic reference signal, and for producing a comparator output signal that changes state when a one of the compared signals becomes greater than the other of the compared signals, and vice-versa; and a circuit for generating the periodic reference signal in response to both the comparator output signal and the error signal. A conditioning circuit receptive of the comparator output signal controls the first and second switches.

BRIEF DESCRIPTION OF THE DRAWINGS

In the following detailed description, reference will be made to the attached drawings in which like reference numerals refer to like, or corresponding elements, throughout the following figures, and in which.

DETAILED DESCRIPTION OF THE PREFERRED EMBODIMENTS

Figure 1:
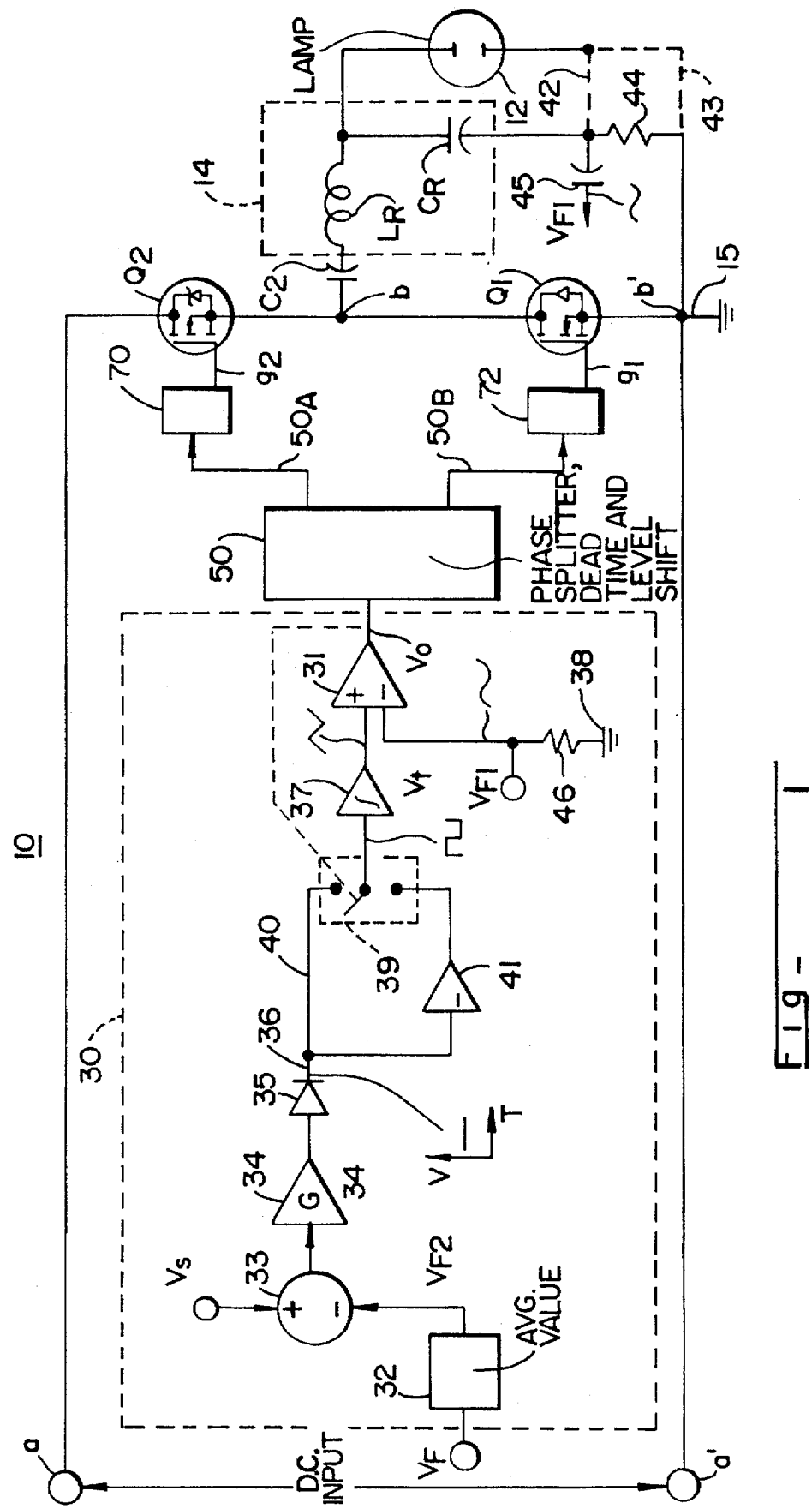
FIG. 1 is a schematic representation of a ballast circuit for a gas discharge lamp which exclusively uses electronic components in a feedback circuit for implementing self-resonant control of a pair of power switches, and which allows a user to dynamically select a level of light output.

As shown in FIG. 1, an electronic ballast arrangement for a compact fluorescent lamp, referenced generally as 10, is effective for converting a standard power line current into a high frequency pulsed signal for driving a compact fluorescent lamp 12. The ballast converter circuit 10 receives a d.c. input signal at terminals a–a', which input signal has been derived from an a.c. input power line and has been rectified and, optionally, corrected for power factor by a rectification and power factor correction circuit (not shown).

The d.c. input signal received by ballast circuit 10 is coupled across a pair of serially connected power MOSFETs designated $Q_1$ and $Q_2$, which can be provided by International Rectifier of El Segundo, Calif. under the product designation HEXFET MOSFET (HEXFET is a registered trademark of International Rectifier). The power MOSFETs $Q_1$ and $Q_2$ are effective upon receiving a control signal at their respective gate, or control, terminals thereto ($g_1$ and $g_2$) for alternately switching between an on and an off condition at a high frequency.

Connected across nodes b–b' is a series resonant lamp circuit which consists of the resonant circuit 14, having the inductor and capacitor elements $L_R$ and $C_R$ selected in size using conventional design means to achieve the desired resonant operating frequency of the lamp 12; capacitor $C_2$, which blocks d.c. current from reaching lamp 12; and the lamp 12, which may comprise a compact fluorescent lamp. Node b' is also shown as ground 15.

Self-resonant feedback control of power MOSFET switches $Q_1$ and $Q_2$ in FIG. 1 is implemented in FIG. 1 with electronic components, the majority of which can be conveniently incorporated into an integrated circuit for controlling operation of ballast arrangement 10.

In FIG. 1, phase control for controlling the alternate switching of MOSFET switches $Q_1$ and $Q_2$ is provided by a phase control circuit 30. A comparator 31 in circuit 30 receives at its inverting input a feedback voltage $V_{F1}$ that is proportional to current in lamp 12. Shown in dashed lines leading from lamp 12 are alternative conductors 42 and 43. Either one of such conductors is used, the other being omitted. Conductor 42 is preferably used for a relatively low d.c. input voltage to circuit 10, e.g. 160 volts, whereas conductor 43 is preferably used for a relatively high d.c. input voltage, e.g. 300 volts. In any event, the current directed through a resistor 44 and the resulting voltage across such resistor have the same phase as the current in lamp 12. Feedback voltage $V_{F1}$ is derived from the voltage across resistor 44, via a d.c. blocking capacitor 45. Resistor 46 provides a d.c. path to ground 38 from the inverting input of comparator 31. Feedback voltage $V_{F1}$ has an a.c. waveform that typically approximates a sinusoidal waveform, as shown in FIG. 1. Voltage $V_{F1}$ is approximately symmetrical about zero-voltage axis, or analog ground 38, and, if necessary, may be provided with a d.c. offset before being input into comparator 31. (Such an offset may typically be required for comparator 31 to properly operate within its input common mode range if incorporated in an integrated circuit having only a single-polarity voltage supply.)

At its non-inverting input, comparator 31 receives a voltage $V_+$, which is preferably a triangular waveform as shown in FIG. 1. Voltage $V_+$, in turn, is produced in response to a setpoint voltage $V_S$ and a feedback voltage $V_F$. Setpoint voltage $V_S$ is typically proportional to a user-selected value for the mount of light output desired, and could be provided from a rheostat-type control, for instance. Feedback voltage $V_F$ represents an average value of a lamp output parameter, such as lamp current or lamp lumens. It could, for instance, comprise the same voltage as a.c. feedback signal $V_{F1}$ that is applied to the inverting input of comparator 31.

A circuit 32 produces a d.c. feedback voltage $V_{F2}$ as an average value of feedback voltage $V_F$. By "average" value is meant herein a d.c. average value such as an r.m.s. value, or a time-averaged value (e.g. daring half a cycle of lamp current). Thus, circuit 32 could comprise an a.c. to r.m.s. converter circuit, or an integrator circuit, both of which are known in the art.

A summing amplifier 33 receives setpoint voltage $V_S$ on its inverting input, and d.c. feedback voltage $V_{F2}$ on its non-inverting input. The error signal produced by summing amplifier 33 is then scaled by a gain factor of G by an amplifier 34, and fed through a p-n, Schottky or other rectifying diode 35. At this point, the voltage on cathode 36 of diode 35 will have a non-negative value, owing to the diode. Such voltage may be as shown in the voltage (V) versus time (T) graph shown in FIG. 1 for a value that is constant for some time.

Figure 5:
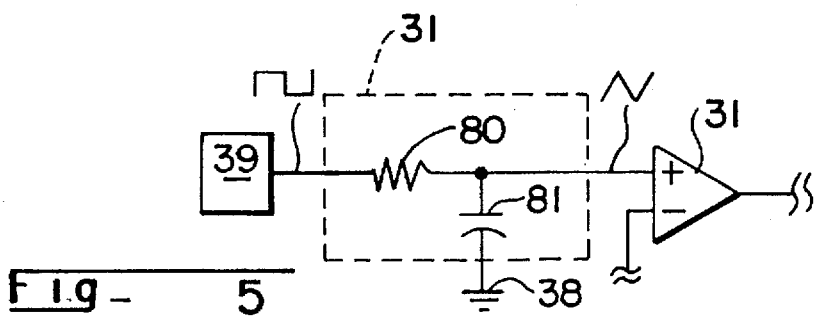
FIG. 5 is a schematic representation of an exemplary implementation of a low pass filter circuit that approximates integrator 37 of FIG. 2.

The voltage on cathode 36 is received by an non-inverting integrator 37 as a rectangular waveform, as shown in FIG. 1, which is referenced to an analog ground 38. Analog ground 38 will usually be different from previously mentioned ground 15 shown beneath transistor $Q_1$ if the supply voltage (not shown) for phase control circuit 30 is unipolar; if the supply voltage is bipolar, analog ground 38 and ground 15 can be the same. Integrator 37 may be approximated by a low pass filter of the resistor-capacitor type, by way of example, as described below (FIG. 5).

Through the switching action of a single-pole, double throw switch 39, integrator 37 is alternately connected directly to p-n diode cathode 36 (via conductor 40) in one switch condition, or connected to cathode 36 through a standard unity-gain inverter 41 in another switch condition. Switch 39 may comprise, for instance, an analog switch sold under product designation CD4053 by Harris Semiconductor, of Melbourne, Fla.; or, an analog switch sold under product designation MC14053B by Motorola, of Phoenix, Ariz. Switch 39 is responsive to output voltage $V_O$ of comparator 31 such that, when the comparator output changes state, the switch 36 alternates in its connection to p-n diode cathode 36. This switching action is illustrated in FIG. 2.

Figure 2:
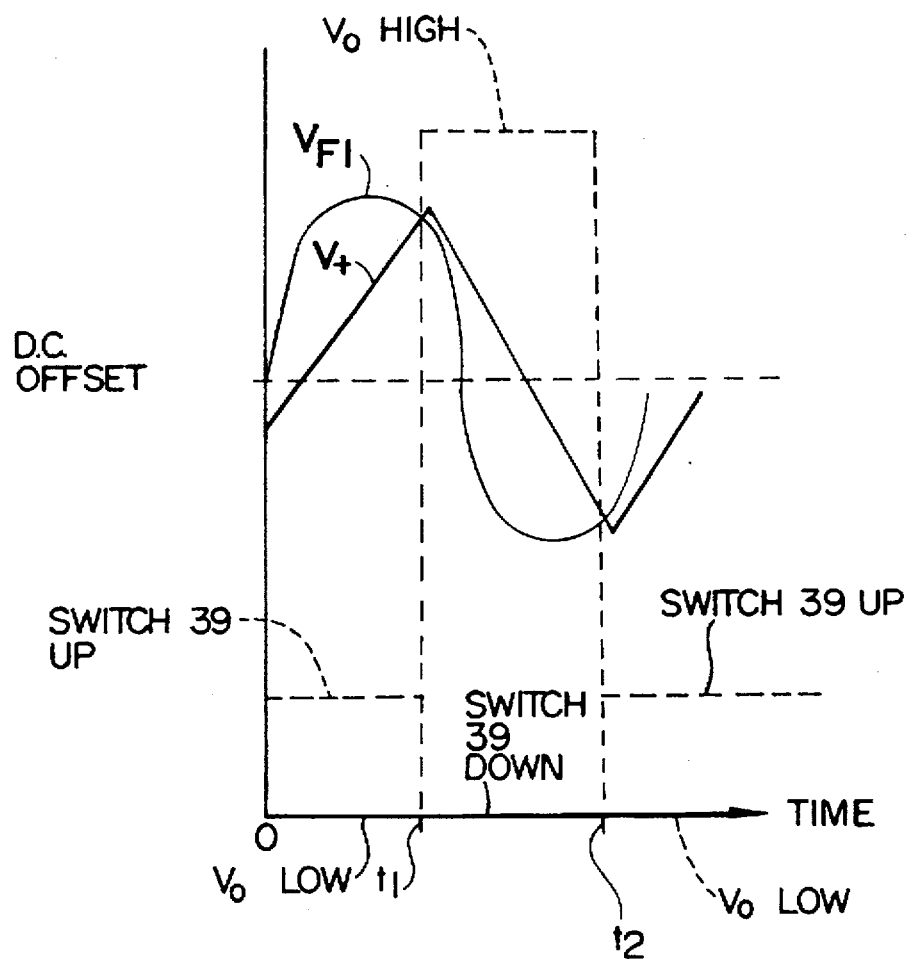
FIG. 2 shows various voltage waveforms together with state diagrams for the output $V_O$ of comparator 31 and of switch 39 of FIG. 1.

FIG. 2 shows voltage waveforms for comparator input voltages $V_{F1}$ and $V_+$ on the same voltage scale, and shows a d.c. offset voltage, which is assumed the same for both voltages $V_{F1}$ and $V_+$. FIG. 2 also shows a high/low state diagram for comparator output voltage $V_O$, and an up/down state diagram for switch 39 as will be further explained below; these state diagrams have arbitrary vertical scales relative to comparator input voltages $V_{F1}$ and $V_+$.

In FIG. 2, comparator output voltage $V_O$ is shown initially as being in a low state. During this time, switch 39 is connected to conductor 40, which is shown above the switch in FIG. 1 and, during this time, is thus designated as being "UP" in FIG. 2. When non-inverting voltage $V_+$ then rises above feedback voltage $V_{F1}$ at time $t_1$, comparator output voltage $V_O$ rises to its high state as shown. Switch 39 is then connected to unity-gain inverter 41, which shown below the switch in FIG. 1 and, during this time, is thus designated as "DOWN" in FIG. 2. When non-inverting input voltage $V_+$ then falls below feedback voltage $V_{F1}$ at time $t_2$, comparator output voltage $V_O$ switches back to its low state as shown.

Non-inverting comparator input voltage $V_+$ will approximate a triangular waveform where integrator 37 is of the resistive-capacitor type. It is preferred that the upward and downward slopes of voltage $V_+$ be fairly linear. This insures at time $t_1$ in FIG. 3, for instance, that input voltage $V_+$ distinctly surpasses the magnitude of input voltage $V_{F1}$ so that comparator 31 will reliably change its output state to a low value; if, in contrast, voltage $V_+$ rounded off to a more level slope at time $t_1$, the desired change of output state of the comparator would be less certain to occur. (The invention would work, however, even if voltage $V_+$ is comprised of a predominantly positive-going portion and a predominantly negative-going portion, so long as the following comparator operation occurs.)

In accordance with operation of comparator 31 (FIG. 1), comparator output $V_O$ changes from a low level to a high level when input non-inverting input $V_+$ exceeds feedback voltage input $V_{F1}$, shown at time $t_1$ in FIG. 2, and changes from a high level to a low level when feedback voltage $V_{F1}$ exceeds input $V_+$, shown at time $t_2$ in FIG. 2. The output of comparator 31 may be alternatively described as changing levels whenever the absolute value of the a.c. portion of non-inverting voltage $V_+$ becomes higher than the absolute value of the a.c. portion of feedback voltage $V_{F1}$, where the following condition is satisfied: Both the waveform for voltage $V_+$ and the waveform for feedback voltage $V_{F1}$ have excursions above an axis of strength that are substantially mirror-images of their excursions below such reference axis, although shifted in time with respect to each other.

Comparator output voltage $V_O$ will typically have a phase advance of, e.g., 20°, to offset the phase delay of, e.g. 20°, occurring in ballast arrangement 10 (FIG. 1) between power switches $Q_1$ and $Q_2$ and current-sensing resistor 44. More generally, however, the phase advance of comparator output voltage $V_O$ could additionally include 360°, or multiples of 360°, phase advance. Comparator output $V_O$ contains the necessary phase information to control operation of power MOSFET switches $Q_1$ and $Q_2$, as will be further described below.

Beneficially, using the phase control circuit 30 of FIG. 1, the power level of lamp 12 can be adjusted by changing the upward and downward slopes of non-inverting voltage $V_+$. By making the slopes both steeper, the comparator output will change earlier, causing the frequency of switching of switches $Q_1$ and $Q_2$ to increase, as is apparent from FIG. 2, which decreases the power level of the lamp. This can be done by a user decreasing setpoint voltage $V_S$. On the other hand, to increase the power of the lamp, a user would increase setpoint voltage $V_S$, causing the frequency of switching of switches $Q_1$ and $Q_2$ to decrease, which increases the power level of the lamp.

Referring again to FIG. 1, comparator output $V_O$ is received by phase splitter, dead time & level shift circuit 50, described below in connection with FIG. 3. Circuit 50 provides appropriate signals on lines 50A and 50B that are respectively received by conventional buffers 70 and 72. These buffers are used to drive the gates of MOSFET switches $Q_1$ and $Q_2$ with a low impedance.

Figure 3:
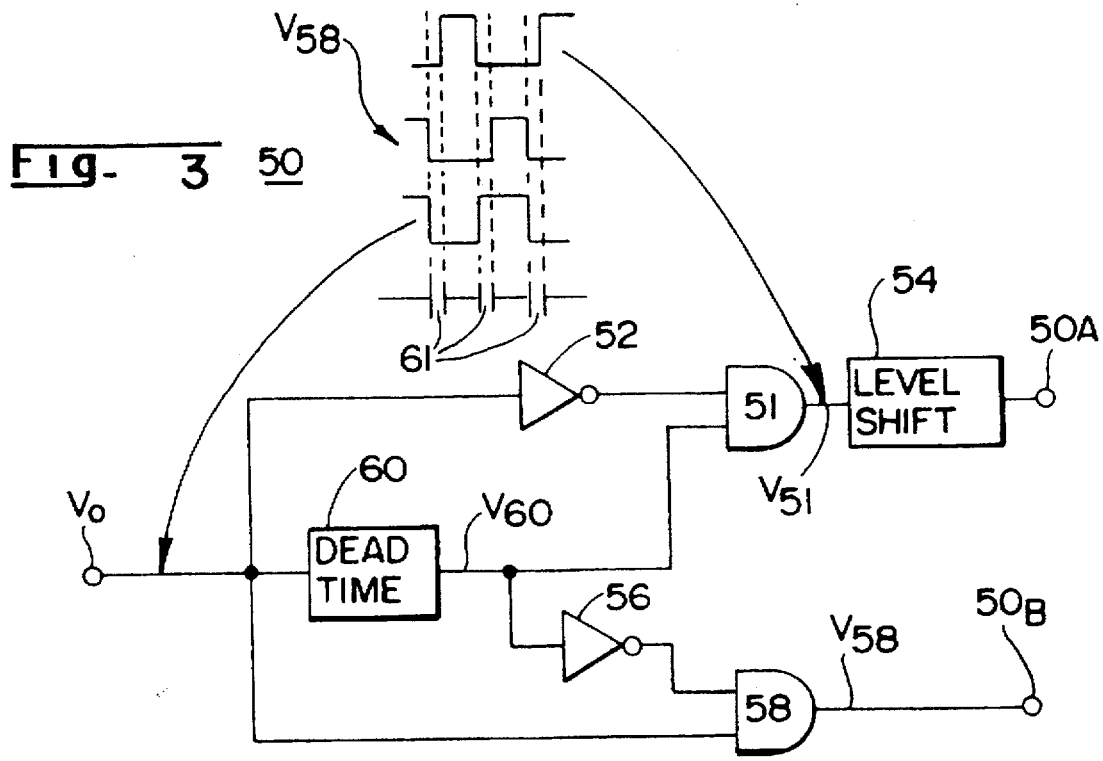
FIG. 3 is a schematic representation of an exemplary implementation of phase splitter, dead time & level shift circuit 50 of FIG. 1.
Figure 4:
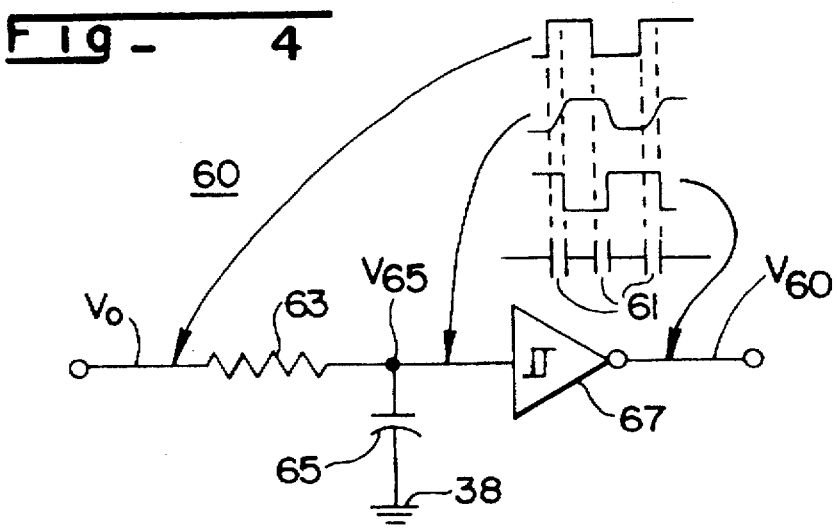
FIG. 4 is a schematic representation of an exemplary implementation of dead time circuit 60 of FIG. 3.

FIG. 3 shows an exemplary implementation of phase splitter, dead time & level shift circuit 50 of FIG. 1. As FIG. 3 shows, comparator output voltage $V_O$ is applied to a dead time circuit 60, one implementation of which is shown in FIG. 4. In FIG. 4, a circuit comprising resistor 63 and capacitor 65 receives comparator output voltage $V_O$, and provides a delayed input, shown as voltage $V_{65}$, to a logic NOT gate 67. Gate 67 is of the type having hysteresis, as indicated by the hysteresis notation in the symbol for gate 67, whereby its input threshold voltage is a function of the state of its output voltage. Gate 67 produces an output voltage $V_{60}$, which transitions in the opposite manner from comparator output $V_O$, but only after respective delay (or dead-time) intervals 61. A typical delay interval 61 for a lamp operating at a frequency of 50 kilohertz is one microsecond.

Referring back to FIG. 3, dead-time circuit output voltage $V_{60}$ is then input into a logic AND gate 51. The other input to gate 51 is the output of logic NOT gate 52, which inverts comparator output $V_O$. The output of AND gate 51, voltage $V_{51}$, is shown in FIG. 3. The output $V_{51}$ is then level-shifted by a conventional level shift circuit 54, to provide an appropriate signal on conductor 50A to drive the gate of upper MOSFET $Q_1$ in FIG. 2 after passing through buffer 70 (FIG. 2).

For driving the gate of the lower MOSFET $Q_2$ in FIG. 2, a gate-driving voltage $V_{58}$ is produced by the circuit of FIG. 3. To accomplish this, a logic NOT gate 56 first inverts dead-time circuit output $V_{60}$ and applies the resulting voltage as one input to logic AND gate 58. The other input to AND gate 58 is comparator output voltage $V_O$. Due to the inclusion of NOT gate 56, the gate-driving output voltage $V_{58}$ of AND gate 58 appears as shown in the figure, with its phase shifted 180° from the phase of gate-drive signal $V_{51}$. This realizes the phase-splitting function of circuit 50.

As further shown in FIG. 3, the high states of gate-drive signal $V_{58}$ are separated from the high states of gate-drive signal $V_{51}$, on both leading and trailing sides, by dead-time intervals 61. This assures high speed operation of MOSFET switches $Q_1$ and $Q_2$, since so-called soft switching techniques (e.g., zero-voltage switching) can be employed.

The various functions of phase splitter, dead time & level shift circuit 50 of FIGS. 1 and 3, as well as the function of buffers 70 and 72 in FIG. 1, can be implemented in an obvious manner by those of ordinary skill in the art. For instance, an IR2155 self-oscillating power MOSFET/IGBT gate driver from International Rectifier of El Segundo, Calif., could be utilized with the connections illustrated for "bootstrap operation" in its Provisional Data Sheet 6.029, dated Jan. 13, 1994. With the foregoing gate driver, the so-called RT input can be left open, and the present comparator output $V_O$ can be applied to the so-called CT input of the gate driver. However, the ability to set the dead time of present dead-time circuit 60 of FIGS. 3 and 4 is not present with the use of the foregoing gate driver.

FIG. 5 shows a low pass filter circuit that approximates integrator 37 of FIG. 1. As shown in the figure, a resistor 80 is connected between the output of analog switch 39 and the non-inverting input of comparator 31. A capacitor 81 is connected between the non-inverting input of the comparator and analog ground 38. The values of resistor 80 and capacitor 81 are preferably chosen to result in non-inverting input voltage $V_+$ (FIG. 2) being approximately linear, for the reasons mentioned above.

Exemplary circuit values for a circuit for 20-watt fluorescent lamp 12 with an operating current of 50 kilo-hertz, with a d.c. input voltage of 300 volts, are as follows: In FIG. 1, resonant inductor $L_R$, 750 micro henries; resonant capacitor $C_R$, 6.8 nanofarads; d.c. blocking capacitor $C_2$, 0.47 microfarads; resistor 44, 1.5 ohms; d.c. blocking capacitor 45, 0.5 microfarads; in FIG. 4, resistor 63 and capacitor 65 selected to provide a delay interval 61 of one microsecond; and in FIG. 5, resistor 80, 6.2k ohms; and capacitor 81, 3.3 nanofarads.

The foregoing describes a ballast circuit for a gas discharge lamp that includes, for controlling a pair of power switches, a self-resonant feedback circuit whose components can be implemented in solid-state form, as opposed to the use of a magnetic transformer. A user-controllable input is provided to adjust the level of light produced by the lamp. Moreover, the majority of the components of the self-resonant feedback circuit can beneficially be incorporated into an integrated circuit.

As will be realized from the foregoing description, the invention provides a ballast circuit for a gas discharge lamp that includes, for controlling a pair of power switches, a self-resonant feedback circuit which allows a user to adjust the output of the lamp during lamp operation. Additionally, the ballast circuit enables a user to select a setpoint for an output parameter of the lamp at which the lamp will more accurately operate. The ballast circuit, moreover, includes a self-resonant feedback comprised of components which can be implemented in solid-state form, and the majority of which can be incorporated into an integrated circuit.

While the invention has been described with respect to specific embodiments by way of illustration, many modifications and changes will occur to those skilled in the art. For instance, either electrodeless or electroded gas discharge lamps may be used with the invention. It is, therefore, to be understood that the appended claims are intended to cover all such modifications and changes as fall within the true scope and spirit of the invention.

What is claimed is:

1. A ballast circuit for a gas discharge lamp, comprising:
   (a) a resonant load circuit incorporating a gas discharge lamp and including first and second resonant impedances whose values determine the operating frequency of said resonant load circuit;
   (b) a d.c.-to-a.c. converter circuit coupled to said resonant load circuit so as to induce an a.c. current in said resonant load circuit, and comprising first and second switches serially connected between a bus conductor at a d.c. voltage and ground, and having a common node through which said bidirectional load current flows;
   (c) an arrangement for allowing a user to select a setpoint signal during lamp operation that determines the amount of light output by the lamp; and
   (d) a feedback arrangement for regeneratively controlling said first and second switches; said arrangement including a circuit for sensing a.c. current in said resonant load circuit and producing an a.c. feedback signal in proportion to said a.c. current; a circuit for producing a d.c. feedback signal representing an average value of a lamp output parameter, and a circuit for generating an error signal between said setpoint signal and said d.c. feedback signal; said feedback arrangement further including:
   (i) a comparator circuit for comparing said a.c. feedback signal with a periodic reference signal, and for producing a comparator output signal that changes state when a first one of the compared signals becomes greater than the second of the compared signals, and that further changes state when the second of the compared signals then becomes greater than the first of the compared signals;
   (ii) a circuit for generating said periodic reference signal in response to both said comparator output signal and said error signal; and
   (iii) a conditioning circuit receptive of said comparator output signal for controlling said first and second switches.

2. The ballast circuit of claim 1, wherein said circuit for generating a periodic reference signal comprises:
   (a) a circuit responsive to said error signal for producing a bi-level output signal having one level when an output of said comparator circuit is at a first level, and having another level when said output of said comparator circuit is at a second level; and
   (b) a conversion circuit for producing an upgoing portion of said periodic reference signal when said bi-level output signal is at one level and for producing a downgoing portion of said periodic reference signal when said bi-level output signal is at another level.

3. The ballast circuit of claim 2, wherein said conversion circuit comprises:
   (a) a resistor receiving said bi-level output signal on one end and producing said periodic reference signal on another end; and
   (b) a capacitor connected between said another end of said resistor and a ground potential.

4. The ballast circuit of claim 1, wherein said circuit for generating a periodic reference signal is effective for producing a substantially triangular reference waveform whose excursions above a reference axis of strength are substantially mirror-images of excursions of the foregoing signal below said reference axis, although shifted in time with respect to each other.

5. The ballast circuit of claim 4, wherein:
   (a) said circuit for producing a feedback signal is effective for producing a feedback waveform whose excursions above a reference axis of strength are substantially mirror-images of excursions of said signal below the foregoing reference axis, although shifted in time with respect to each other; and
   (b) the mentioned reference axes of strength of said periodic reference signal and of said feedback signal are approximately equal to each other.

6. A ballast circuit for a gas discharge lamp, comprising:
   (a) a resonant load circuit incorporating a gas discharge lamp and including first and second resonant impedances whose values determine the operating frequency of said resonant load circuit;
   (b) a d.c.-to-a.c. converter circuit coupled to said resonant load circuit so as to induce an a.c. current in said resonant load circuit, and comprising first and second switches serially connected between a bus conductor at a d.c. voltage and ground, and having a common node through which said bidirectional load current flows;
   (c) an arrangement for allowing a user to select a setpoint signal during lamp operation that determines the amount of light output by the lamp; and
   (d) a feedback arrangement for regeneratively controlling said first and second switches; said arrangement including a circuit for sensing a.c. current in said resonant load circuit and producing an a.c. feedback signal in proportion to said a.c. current; a circuit for producing a d.c. feedback signal representing an average value of lamp current; and a circuit for generating an error signal between said setpoint signal and said d.c. feedback signal; said feedback arrangement further including:

(i) a comparator circuit for comparing said a.c. feedback signal with a periodic reference signal, and for producing a comparator output signal that changes state when a first one of the compared signals becomes greater than the second of the compared signals, and that further changes state when the second of the compared signals then becomes greater than the first of the compared signals;

(ii) a circuit for generating said periodic reference signal in response to both said comparator output signal and said error signal; and (iii) a conditioning circuit receptive of said comparator output signal for controlling said first and second switches.

7. The ballast circuit of claim 6, wherein said circuit for generating a periodic reference signal comprises:

(a) a circuit responsive to said error signal for producing a bi-level output signal having one level when an output of said comparator circuit is at a first level, and having another level when said output of said comparator circuit is at a second level; and (b) a conversion circuit for producing an upgoing portion of said periodic reference signal when said bi-level output signal is at one level and for producing a downgoing portion of said periodic reference signal when said bi-level output signal is at another level.

8. The ballast circuit of claim 7, wherein said conversion circuit comprises:

(a) a resistor receiving said hi-level output signal on one end and producing said periodic reference signal on another end; and (b) a capacitor connected between said another end of said resistor and a ground potential.

9. The ballast circuit of claim 6, wherein said circuit for generating a periodic reference signal is effective for producing a substantially triangular reference waveform whose excursions above a reference axis of strength are substantially mirror-images of excursions of the foregoing signal below said reference axis, although shifted in time with respect to each other.

10. The ballast circuit of claim 9, wherein:

(a) said circuit for producing a feedback signal is effective for producing a feedback waveform whose excursions above a reference axis of strength are substantially mirror-images of excursions of said signal below the foregoing reference axis, although shifted in time with respect to each other; and (b) the mentioned reference axes of strength of said periodic reference signal and of said feedback signal are approximately equal to each other.

* * * * *